US010705581B2

(12) United States Patent
La Monica et al.

(10) Patent No.: US 10,705,581 B2
(45) Date of Patent: Jul. 7, 2020

(54) CONTROLLING DEVICE PERFORMANCE BASED ON TEMPERATURE DIFFERENTIAL

(71) Applicant: Motorola Mobility LLC, Chicago, IL (US)

(72) Inventors: Donald La Monica, Elmhurst, IL (US); Jason Knopsnyder, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 183 days.

(21) Appl. No.: 15/469,353

(22) Filed: Mar. 24, 2017

(65) Prior Publication Data
US 2018/0275728 A1   Sep. 27, 2018

(51) Int. Cl.
| | |
|---|---|
| *G06F 1/20* | (2006.01) |
| *G05B 15/02* | (2006.01) |
| *G05D 23/19* | (2006.01) |
| *G06F 1/32* | (2019.01) |
| *G06F 1/324* | (2019.01) |
| *G06F 1/3206* | (2019.01) |
| *G06F 1/3296* | (2019.01) |

(52) U.S. Cl.
CPC ............. *G06F 1/206* (2013.01); *G05B 15/02* (2013.01); *G06F 1/324* (2013.01); *G06F 1/3206* (2013.01); *G06F 1/3296* (2013.01)

(58) Field of Classification Search
CPC ........ G06F 1/206; G06F 1/324; G06F 1/3234; G05B 15/02; G05D 23/1917
See application file for complete search history.

(56) References Cited

U.S. PATENT DOCUMENTS

| | | | | |
|---|---|---|---|---|
| 7,844,876 | B2 * | 11/2010 | Wyatt ................... | G01K 1/026 365/201 |
| 8,550,702 | B2 * | 10/2013 | Campbell .......... | G01F 25/0007 318/471 |
| 9,606,591 | B2 * | 3/2017 | Kwon ..................... | G06F 1/206 |
| 2003/0152118 | A1 * | 8/2003 | Chieng .............. | H01S 5/06804 372/34 |
| 2003/0169790 | A1 * | 9/2003 | Chieng .............. | H01S 5/06804 372/34 |

(Continued)

OTHER PUBLICATIONS

Qing Zie et al., "Therminator: A Thermal Simulator for Smartphones Producing Accurate Chip and Skin Temperature Maps", http://dx.doi.org/10.1145/2627369.2627641, ISLPED'14, Aug. 11-13, 2014, 6 pages.

*Primary Examiner* — Charles R Kasenge
(74) *Attorney, Agent, or Firm* — Kunzler Bean & Adamson

(57) ABSTRACT

For controlling device performance based on temperature differential, an apparatus includes a plurality of sensors positioned at different locations of the apparatus, a controller, and a memory that stores code executable by the controller. The controller determines a plurality of temperatures using the plurality of sensors. Here, each temperature corresponds to a different location of the apparatus. The controller calculates a temperature differential for the apparatus using the plurality of temperatures. The controller maintains device performance in response to the temperature differential being within a threshold amount and throttles device performance in response to the temperature differential exceeding the threshold amount.

20 Claims, 7 Drawing Sheets

(56) References Cited

U.S. PATENT DOCUMENTS

| | | | | |
|---|---|---|---|---|
| 2005/0111501 | A1* | 5/2005 | Chieng | H01S 5/06804 |
| | | | | 372/29.02 |
| 2005/0121632 | A1* | 6/2005 | Chieng | H01S 5/06804 |
| | | | | 250/559.1 |
| 2008/0039981 | A1* | 2/2008 | Wyatt | G01K 1/026 |
| | | | | 700/299 |
| 2008/0040067 | A1* | 2/2008 | Bashor | G06F 11/24 |
| | | | | 702/132 |
| 2008/0040408 | A1* | 2/2008 | Wyatt | G01K 1/026 |
| | | | | 708/204 |
| 2008/0101038 | A1* | 5/2008 | Ali | G06F 1/203 |
| | | | | 361/720 |
| 2010/0169039 | A1* | 7/2010 | Hosokawa | G06F 1/206 |
| | | | | 702/136 |
| 2013/0091348 | A1* | 4/2013 | Kwon | G06F 1/206 |
| | | | | 713/100 |
| 2016/0062423 | A1* | 3/2016 | Kim | G06F 1/206 |
| | | | | 713/320 |
| 2016/0226110 | A1* | 8/2016 | Jin | H01M 10/635 |
| 2016/0291613 | A1* | 10/2016 | Smith | G05D 23/1917 |
| 2016/0291653 | A1* | 10/2016 | Vootukuru | G01K 13/00 |
| 2017/0041387 | A1* | 2/2017 | Saffre | H04L 67/1008 |
| 2017/0074729 | A1* | 3/2017 | Coutts | G01K 13/00 |
| 2017/0083064 | A1* | 3/2017 | Mittal | G05B 15/02 |
| 2017/0102676 | A1* | 4/2017 | Park | G05B 15/02 |
| 2017/0168514 | A1* | 6/2017 | Mittal | G01K 13/00 |
| 2017/0185119 | A1* | 6/2017 | Kwon | G06F 1/206 |
| 2017/0192473 | A1* | 7/2017 | Lee | G06F 1/206 |
| 2017/0220445 | A1* | 8/2017 | Cunningham | G06F 11/3409 |
| 2018/0073933 | A1* | 3/2018 | Keskin | G01K 1/14 |

\* cited by examiner

CONTROLLING DEVICE PERFORMANCE BASED ON TEMPERATURE DIFFERENTIAL

FIELD

The subject matter disclosed herein relates to thermal mitigation for electronic devices and more particularly relates to controlling device performance based on a temperature differential.

BACKGROUND

Description of the Related Art

Thermal mitigation systems are used to keep critical temperatures within specified limits whether the region of interest is the outside surface of the device, an internal component, or an internal area of device. Thermal mitigation systems today do this by reacting to absolute temperatures within system.

BRIEF SUMMARY

A method for controlling device performance based on temperature differential is disclosed. The method includes measuring a plurality of temperatures of a device. Each measured temperature corresponds to a different location within the device. The method includes calculating, using a processor, an amount of temperature variance using the plurality of temperatures.

The method also includes maintaining device performance in response to the amount of temperature variance being within a threshold amount. The method further includes reducing device performance in response to the amount of temperature variance exceeding the threshold amount. Also disclosed are an apparatus and program product which perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
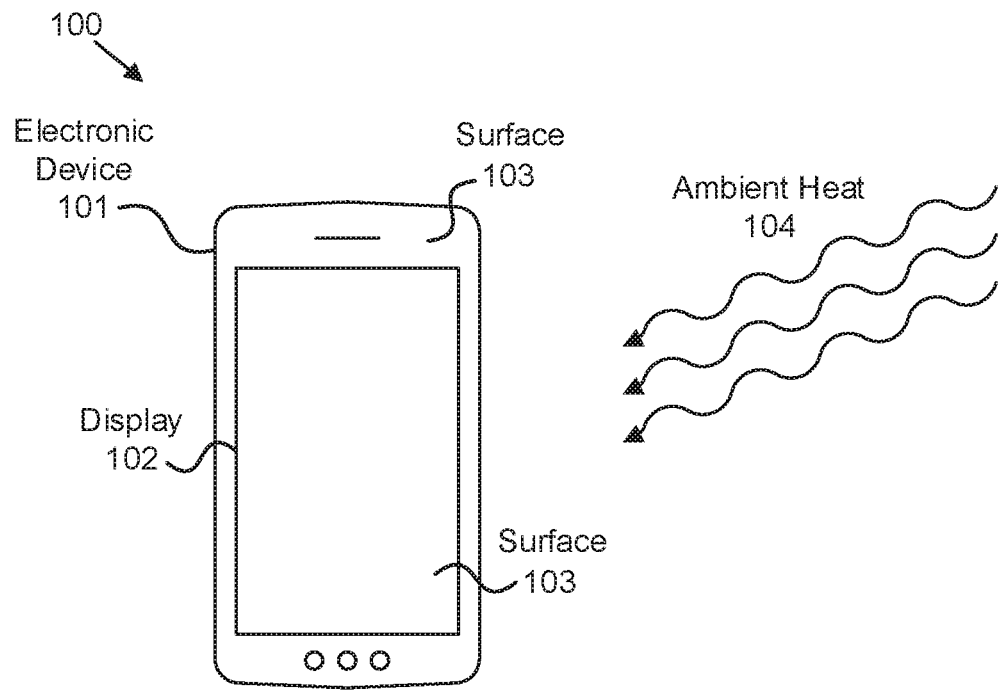
FIG. 1A is a drawing illustrating one embodiment of a system for controlling device performance based on temperature differential.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. Such code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The disclosed embodiments provide systems, apparatuses, methods, and computer program products for thermal mitigation using temperature differential. To improve system performance while mitigating heat generation at a device, an array of temperature sensors is used to differentiate between internal heat sources (e.g., processor load) and external heat sources. The thermal response of the device reduces temperature uniformity (e.g., increases temperature differential) when internally loaded, thus the degree of temperature uniformity indicates whether device heating is from ambient heating (e.g., external source) or internal generation.

Where heat is externally generated, system performance and power can be maintained or increased. Accordingly, the processor is not throttled unless a critical temperature is reached. Instead, the processor performance is maintained until internal heat generation dominates. Thus, the processor is throttled only when the dominant heat source is an internal heat source (e.g., the increased temperatures are due to internally generated heat). Doing so allows system performance to be increased in high ambient conditions that would normally cause system performance to be reduced, thereby maximizing processing performance in conditions of high ambient heat. The disclosed thermal mitigation techniques may be used in combination with traditional throttling schemes. For example, the disclosed thermal mitigation techniques may override the traditional throttling scheme so long as the temperature differential is less than a threshold level.

For example, when a mobile phone is left in the sun or a hot environment, the external heat source is detected by analyzing temperature reading from multiple temperature sensors located throughout the mobile phone. Here, all the temperature sensors will be equal to one another or within a degree or two of each other, indicating an external heat source. In contrast, when the heat source in internal, one or more temperature sensors will be significantly higher than the others indicating a high power situation which will result in heat transfer from the interior of the mobile phone to the surface. By monitoring a temperature differential to distinguish internal heat sources from external heat sources, the disclosed embodiments avoid premature processor throttling thereby improving performance while abiding the maximum outside surface temperature and processor temperature limits of the mobile phone.

While techniques for thermal mitigation affecting system performance are generally discussed herein as increasing, maintaining, or reducing CPU clock frequency, other techniques for reducing internal heat generation may also be used. For example, the system may adjust power adapter output power, modem throughput, graphics performance, RAM performance, dimming of display, reducing charge current, and the like. These techniques may be used in place of or in addition to CPU frequency scaling. In addition, the system may selectively enable or disable device sub-systems as needed to control internal heat generation arises. For example, a system may include a temperature sensor for each RF power amplifier, one for power management integrated circuit ("IC"), one for memory device (e.g., RAM), one for the CPU, one for charging connector, etc. The system then manages performance of the various components in response temperatures or temperature differentials exceed predetermined amounts, as described herein.

An apparatus for thermal mitigation based on temperature differential includes a plurality of sensors positioned at different locations of the apparatus, a controller, and a memory that stores code executable by the controller. The controller determines a plurality of temperatures using the plurality of sensors. Here, each temperature corresponds to a different location of the apparatus. The controller calculates a temperature differential for the apparatus using the plurality of temperatures. The temperature differential may also be referred to as a temperature gradient or temperature variance. The controller maintains device performance in response to the temperature differential being within a threshold amount and throttles device performance in response to the temperature differential exceeding the threshold amount.

In certain embodiments, increasing device performance includes maintaining a device performance level (e.g., CPU clock frequency) in response to the device operating at a maximum performance level and increasing the device performance level in response to the device operating at a level below the maximum performance level. Similarly, reducing device performance may include maintaining a device performance level in response to the device operating at a minimum performance level and decreasing the device performance level in response to the device operating at a level above the minimum performance level.

In some embodiments, calculating the temperature differential for the apparatus includes the controller identifying a maximum temperature among the plurality of temperatures and identifying a minimum temperature among the plurality of temperatures. In such embodiments, the temperature differential is the difference between the maximum temperature and the minimum temperature. In other embodiments, the temperature differential may be the standard deviation of the plurality of temperature, the statistical variance of the plurality of temperatures, or the like.

In certain embodiments, the controller further compares the plurality of temperatures to a first temperature threshold. In such embodiments, throttling device performance in response to the temperature differential exceeding the threshold amount includes the controller reducing a processor operating frequency (e.g., clock frequency) in response to a temperature exceeding the first temperature threshold and the temperature differential exceeding the differential threshold and maintaining the processor operating frequency in response to a temperature not exceeding the first temperature threshold. Where the processor operating frequency is adjusted, an operating voltage for processor may also be adjusted to maintain stable operation.

In certain embodiments, the controller further compares the measured temperatures to a second temperature threshold greater than the first temperature threshold and reduces the processor operating frequency in response to a temperature exceeding the second temperature threshold. In one embodiment, the second temperature threshold is a maximum surface temperature. In another embodiment, the second temperature threshold is a maximum circuit temperature.

In some embodiments, the apparatus includes a plurality of power domains with each power domain including a throttleable component. In such embodiments, at least one of the plurality of temperatures corresponds to each power domain. In certain embodiments, the controller further identifies a power domain causing elevated temperatures in response to the temperature differential exceeding the threshold amount. In such embodiments, throttling device performance includes the controller reducing performance of the throttleable component of the identified power domain. In one embodiment, identifying a power domain causing elevated temperatures includes the controller calculating a temperature differential among the plurality of power domains and comparing the temperature differential to a threshold level. In one embodiment, calculating the temperature differential for the apparatus comprises calculating the difference between a hottest power domain and a coolest power domain. In certain embodiments, determining the plurality of temperatures using the plurality of sensors includes calculating at least one temperature from an amount of current.

A method for thermal mitigation based on temperature differential includes measuring a plurality of temperatures of a device. Each temperature may correspond to a different location within the device. The method also includes calculating, using a processor, an amount of temperature variance using the plurality of temperatures. The method further includes maintaining device performance in response to the amount of temperature variance being within a threshold amount and reducing device performance in response to the amount of temperature variance exceeding the threshold amount.

In certain embodiments, calculating the amount of temperature variance includes determining a standard deviation of the plurality of temperatures. In some embodiments, the method includes comparing the plurality of temperatures to a first temperature threshold. In such embodiments, throttling device performance in response to the temperature gradient exceeding the threshold amount includes reducing a processor operating frequency in response to a temperature exceeding the first temperature threshold and the temperature gradient exceeding the gradient threshold and maintaining the processor operating frequency in response to a temperature not exceeding the first temperature threshold.

In certain embodiments, the method further includes comparing the measured temperatures to a second temperature threshold greater than the first temperature threshold and reducing the processor operating frequency in response to a temperature exceeding the second temperature threshold. In one embodiment, the second temperature threshold is one of a maximum surface temperature and a maximum circuit temperature.

In some embodiments, measuring a plurality of temperatures of a device includes measuring a temperature for a plurality of power domains within the device. In such embodiments, reducing device performance in response to the amount of temperature variance exceeding the threshold amount includes reducing performance only at power domains having a temperature variance exceeding the threshold amount unless the measured temperatures exceed the second temperature threshold. In one embodiment, the power domain temperature variance is calculated using the temperatures of the plurality of power domains within the device.

A program product for thermal mitigation based on temperature differential includes a computer readable storage medium that stores code executable by processor, the executable code including code to perform: measuring a plurality of temperatures of a device, calculating a temperature gradient using the plurality of temperatures, determining from the temperature gradient whether the device is one of internally heated and externally heated in response to a measured temperature exceeding a threshold temperature, reducing device performance in response to the device being internally heated, and maintaining device performance in response to the device being externally heated. Here, each temperature corresponds to a different power domain of the device.

In certain embodiments, the program product also includes code to increase device performance in response to the measured temperature becoming less than the threshold temperature. The program product may also include code to compare the measured temperatures to a maximum temperature greater than the temperature threshold and reduce device performance in response to a temperature exceeding the maximum temperature.

FIG. 1A illustrates a system 100 for thermal mitigation based on temperature differential, according to embodiments of the disclosure. In the depicted embodiment, the system 100 includes an electronic device 101 having a display 102 and a surface 103. The electronic device may be exposed to ambient heat 104. In certain embodiments, the ambient heat 104 is due to exposure to light from the sun or another strong light source. In other embodiments, the ambient heat 104 may be from the electronic device 101 being places in a hot environment, next to a hot object, and/or upon a hot surface. Examples of electronic devices 101 include, but are not limited to, a mobile telephone, a tablet computer, a laptop computer, a camera, a gaming system, a portable entertainment system, a media player, a sever, or any other processing device using thermal mitigation.

Figure 1B:
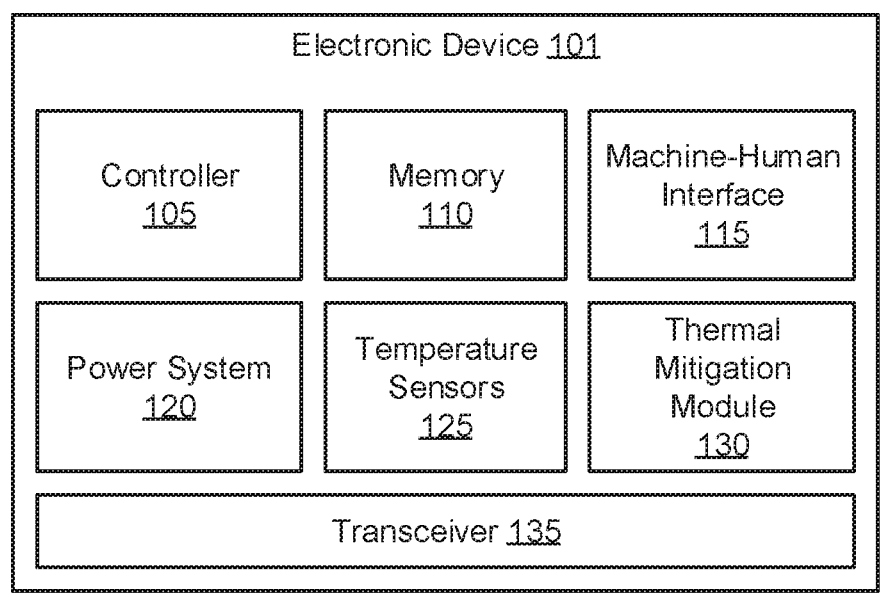
FIG. 1B is a schematic block diagram illustrating one embodiment of an apparatus for controlling device performance based on temperature differential

FIG. 1B is a schematic block diagram of the electronic device 101, according to embodiments of the disclosure. The electronic device 101 includes a controller 105, a memory 110, a machine-human interface ("MHI") 115, a power system 120, a plurality of temperature sensors 125, and a thermal mitigation module 130. The MHI 115 includes the display 102. In certain embodiments, the electronic device 101 also include a transceiver 135.

The controller 105, in one embodiment, may include any known controller capable of executing computer-readable instructions and/or capable of performing logical operations. For example, the controller 105 may be a microcontroller, a microprocessor, a central processing unit ("CPU"), a graphics processing unit ("GPU"), an auxiliary processing unit, a field programmable gate array ("FPGA"), or similar programmable controller. In certain embodiments, the controller 105 is a processor coupled to the thermal mitigation module 130. In some embodiments, the controller 105 executes instructions stored in the memory 110 to perform the methods and routines described herein.

The controller 105 is communicatively coupled to the memory 110, the MHI 115, the power system 120, the temperature sensors 125, the thermal mitigation module 130, and the transceiver 135 (when equipped). The controller 105 is an internal heat source contributing to the internal temperatures and the surface temperature of the electronic device 101. Accordingly, the thermal mitigation module 130 gathers temperature data for the controller 105 and selectively increases, maintains, and reduces (e.g., throttles) performance of the controller 105 in response to temperatures and/or temperature differentials exceeding predetermined amounts, as described herein.

The controller 105 may be physically and/or logically divided into multiple power domains. As used herein, a "power domain" refers to a section (e.g., a "domain") of the controller 105 that operates at a particular power level. For example, a power domain may be a collection of transistors powered by the same power and ground supply. The power level may be defined by a combination of clock speed (e.g., clock frequency) and voltage level. In certain embodiments, each power domain has its own clock source so that component of the power domain may be throttled independently of other power domains.

Where multiple power domains are present, the controller 105 may include circuitry for converting voltage differences and/or synchronizing data delivery between the power domains. Additionally, a temperature sensor 125 may be location at (or adjacent to) each power domain and the multiple domains may be controlled independently by the thermal mitigation module 130. Thus, the thermal mitigation module 130 may reduce performance (e.g., throttle) one power domain independently of the others, as described herein.

The memory 110, in one embodiment, is a computer readable storage medium. In some embodiments, the memory 110 includes volatile computer storage media. For example, the memory 110 may include a RAM, including dynamic RAM ("DRAM"), synchronous dynamic RAM ("SDRAM"), and/or static RAM ("SRAM"). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to thermal mitigation based on temperature differential, such as temperature data, location data, temperature thresholds, temperature differentials, differential thresholds, and the like. In some embodiments, the memory 110 also stores program code and related data, such as an operating system or other controller algorithms operating on the electronic device 101. In some embodiments, the thermal mitigation module 130 may gather temperature data for the memory 110 and reduce performance of the memory 110 (e.g., memory speed and/or voltage level) when temperatures and/or temperature differentials exceed predetermined amounts.

The MHI 115, in one embodiment, facilitates human interaction with the electronic device 101 and includes input and/or output functions. For example, the MHI 115 may include any known computer input device including a touch panel, a button, a keyboard, a stylus, a microphone, and the like. In one embodiment, the MHI 115 may include a camera for capturing image data. In some embodiments, the MHI 115 includes two or more different input devices, such as a touch panel and a button, dial, selector, etc.

In certain embodiments, the MHI 115 is capable of outputting audible and/or haptic signals. For example, the MHI 115 may include one or more speakers for producing an audible alert or notification (e.g., a beep or chime) or other sound. In some embodiments, the MHI 115 includes one or more haptic devices for producing vibrations, motion, or other haptic feedback. In some embodiments, all or portions of the MHI 115 may be integrated with the display 102. For example, the display 102 may form a touchscreen or similar touch-sensitive display. In certain embodiments, the MHI 115 includes additional hardware devices located near the display 102, such as an additional button, key, etc., a microphone, a speaker, and the like. In some embodiments, the thermal mitigation module 130 may gather temperature data for the MHI 115 (e.g., the display 102) and reduce performance of the MHI 115 (e.g., display 102) when temperatures and/or temperature differentials exceed predetermined amounts.

The power system 120, in one embodiment, provides power to the various components of the electronic device 101. The power system 120 includes a power source and circuitry for delivering electrical power to the various components of the electronic device. Examples of power sources include, but are not limited to, a battery, a capacitor (e.g., super capacitor), a fuel cell, and a power supply unit ("PSU") for converting mains power to regulated DC power. The power system 120 may include circuitry for converting voltages, currents, waveforms, or other electrical properties. The power system 120 may include a power adapter, a charging port, a power jack, or the like for receiving electrical power from an outside source and converting it to a form usable within the electronic device 101. Where the electronic device includes multiple power domains, the power system 120 may include circuitry for delivering power at different levels to the different power domains within the electronic device 101.

In certain embodiments, the power system 120 may include one or more sensors that measure power delivery to components of the electrical device. For example, the power system 120 may include one or more coulomb counters for measuring current delivery. The sensors may be used to determine a state of charge of a battery or other rechargeable power source. Additionally, the sensors may be used to measure power delivery to one or more components of the electronic device 101, such as the controller 105, the memory 110, the display 102, the transceiver 135, etc. In certain embodiments, current levels may be used to estimate temperatures at the power system 120 or the components receiving power.

The temperature sensors 125, in one embodiment, measure temperatures at the electronic device 101. As noted above, the electronic device 101 includes a plurality temperature sensors 125. The temperature sensors may be located at various locations of the electronic device 101. For example, one temperature sensor 125 may be located at (or near) the surface 103. As another example, a temperature sensor 125 may be located at or near the controller 105. Generally, the electronic device 101 includes a temperature sensor 125 near a potential heat source (e.g., the controller 105, power system 120, and/or transceiver 135) or near a temperature-sensitive region (e.g., the surface 103). The multiple temperature sensors 125 allow for determination of a temperature differential at the electronic device 101.

In certain embodiments, a temperature sensor 125 may measure a current passing through a component (e.g., using a coulomb counter) and estimate a temperature using the measured current. However, system power cannot always be measured directly as measurement capability may be lost when a charger is attached. Further, temperatures measurements may be desired from location where no current runs, such as at the device surface. Thus, at least two temperature sensors 125 may be thermistors, thermocouples, resistance temperature detectors, or other electrical circuit that measures temperature directly.

The thermal mitigation module 130, in one embodiment, processes temperature data from the temperature sensors 125 and calculates a temperature differential from the temperature data. Because the electronic device 101 includes a plurality of temperature sensors 125, the thermal mitigation module 130 is able to calculate a temperature differential at the electronic device 101. The thermal mitigation module 130 triggers one or more thermal mitigation responses at the electronic device 101 based on a temperature differential and the temperature differential. The thermal mitigation module 130 may be used in combination with traditional throttling schemes. For example, the thermal mitigation module 130 may override a traditional throttling scheme so long as the temperature differential is within than a threshold amount.

In some embodiments, the thermal mitigation module 130 maintains performance of the electronic device 101 in response to the temperature differential being within a threshold amount (e.g., less than a differential threshold) and reduces performance of the electronic device 101 (e.g., throttles CPU clock frequency) in response to the temperature differential exceeding the threshold amount (e.g., reaching the differential threshold). The thermal mitigation module 130 may include circuitry for adjusting clock frequencies at the electronic device 101, or may instruct the controller 105 to adjust clock frequencies at the electronic device 101. Where the processor operating frequency is adjusted, an operating voltage for processor may also be adjusted to maintain stable operation.

Additionally, the thermal mitigation module 130 may compare the measured temperatures to various thresholds (e.g., a first (activation) threshold, a second (critical) threshold higher than the first, etc.) and increase, maintain, or reduce performance of the electronic device 101 based on both the temperature differential and the comparison of measured temperatures to the thresholds. Where the electronic device 101 includes multiple, interpedently-throttleable power domains, the thermal mitigation module 130 may calculate a temperature differential for each power domain and increase, maintain, or reduce performance of each power domain based on its respective temperature differential. In one embodiment, the temperature differential for each power domain is calculated as a temperature variance among the multiple power domains. In another embodiment, the temperature differential for each power domain is the temperature difference between the power domain and a surface of the electronic device 101.

In one embodiment, the thermal mitigation module 130 is directly coupled to the plurality of temperature sensors 125. In other embodiments, the thermal mitigation module 130 accesses temperatures sensed by the plurality of temperature sensors 125 by receiving signals from the controller 105 and/or by reading temperature data stored in locations of the memory 110. In one embodiment, the thermal mitigation module 130 is implemented by circuitry separate from the controller 105. In another embodiment, the thermal mitigation module 130 is a component of the controller 105. In certain embodiments, the thermal mitigation module 130 is implemented by program code executing on a processor, such as the controller 105 or another processor in the electronic device 101.

The transceiver 135, in one embodiment, enables the electronic device 101 to communicate with data networks and/or other computing devices. The transceiver 135, may be configured to send and to receive electronic communications to correspondent devices either directly (e.g., using a direct device-to-device connection) or via a communication network (e.g., an ad hoc network or infrastructure network). In certain embodiments, the transceiver 135 is a wireless transceiver capable of exchanging information via electromagnetic radiation (e.g., communication via radio frequencies, infrared, visible light, and the like) or sound (e.g., ultrasonic communication). In certain embodiments, the transceiver 135 is a wired transceiver capable of exchanging information via a transmission line (e.g., wire, data cable, or optical fiber). In some embodiments, the transceiver 135 is an internal heat source contributing to the internal temperatures and the surface temperature of the electronic device 101. Here, the thermal mitigation module 130 may gather temperature data for the transceiver 135 and reduce performance of the transceiver 135 when temperatures and/or temperature differentials exceed predetermined amounts.

In certain embodiments, the electronic device 101 includes additional components or circuitry as known in the art. For example, the electronic device 101 may include cooling components such as a heat spreader, heat sink, or fan for dissipating heat from the electronic device 101. In one embodiment, the thermal mitigation module 130 selectively activates an active cooling component, such as a fan, in response to temperatures and/or temperature differentials exceeding predetermined amounts. As another example, the electronic device 101 may include additional sensors for identifying a state of the environment and/or state of the electronic device 101, such as light sensors, proximity sensors, positioning sensors, and the like. Further, the electronic device 101 may include at least one current sensor (e.g., coulomb counter) that estimates temperature using a measured current and a look-up table correlating electric current to temperature.

Figure 2:
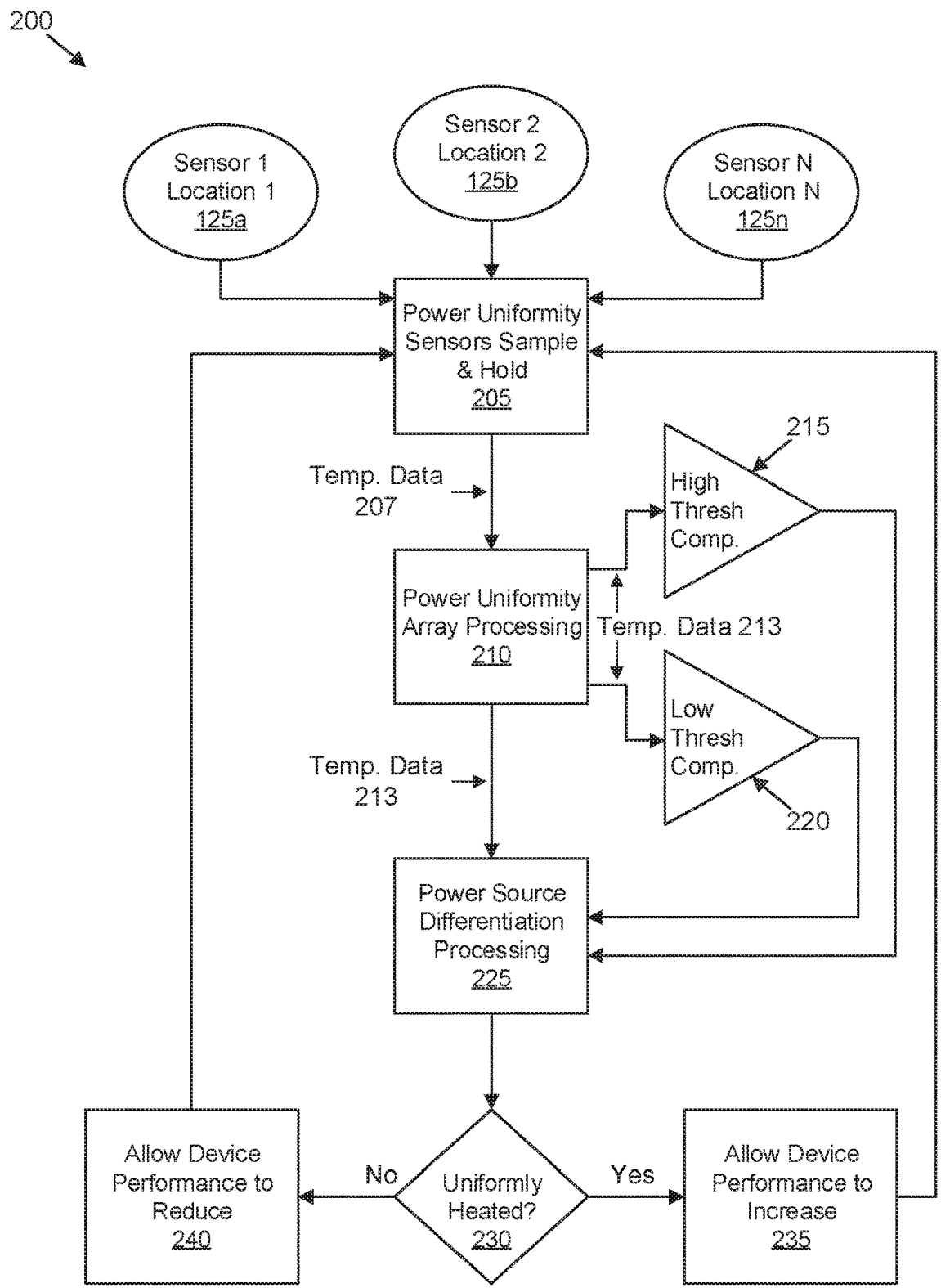
FIG. 2 is a functional diagram illustrating one embodiment of a thermal mitigation system.

FIG. 2 depicts a thermal mitigation system 200 for device throttling based on a temperature differential, according to embodiments of the disclosure. In one embodiment, the thermal mitigation system 200 may be implemented by a thermal mitigation module 130 coupled to a plurality of temperature sensors 125. In another embodiment, the thermal mitigation system 200 may be implemented by a power management unit of the controller 105. Still further, the thermal mitigation system 200 may be implemented by one or more IC chips coupled to a plurality of temperature sensors 125 and in communication with the controller 105.

As depicted, the thermal mitigation system 200 receives the sensor data from a plurality of sensors 125a-n. Here, the sensors 125a-n are embodiments of the temperature sensors 125, discussed above with reference to FIG. 1. The sensors 125a-n feed temperature measurements to a component of the thermal mitigation system 200 that samples and stores the temperatures, depicted here as the Power Uniformity Sensor Sample and Hold ("PUSSH") block 205.

Each of the sensors 125a-n is positioned at a different location within the device (e.g., the electronic device 101). For example, at least one of the sensors 125a-n may be located at the device surface (e.g., a display surface, a back surface of a handheld device, a bottom surface of a laptop or tablet computer, a palm rest of a laptop computer). Generally, the surface sensor is located at a device surface where the user is likely to touch. Beneficially, the thermal mitigation system 200 can monitor the surface temperatures of the device to keep the surface at a touch-safe temperature level.

As another example, one of the sensors 125a-n may be located at a microprocessor or integrated circuit within the device, such as a CPU, GPU, or other microcontroller. Beneficially, the thermal mitigation system 200 can monitor a temperature of the integrated circuit to keep the circuitry below its junction temperature (e.g., the highest allowable operating temperature). Similarly, by locating at least one of the sensors 125a-n at the display 102, the thermal mitigation system 200 can monitor a display temperature to keep the display 102 within an operating temperature range.

The PUSSH block 205 may sample temperature measurements from the sensors 125a-n at a predefined rate. The PUSSH block 205 feeds temperature data 207 to the Power Uniformity Array Processing ("PUAP") block 210. In certain embodiments, the PUSSH block 205 converts signals from the sensors 125a-n into data usable by the PUAP block 210. For example, one or more of the sensors 125a-n may transmit a voltage representative of the temperature to the PUSSH block 205, wherein the PUSSH block 205 converts the voltage into a binary value.

The PUAP block 210 processes the incoming temperature data 207 from the PUSSH block 205. The PUAP block 210 identifies a temperature differential from the temperature data 207, as well as both maximum and minimum temperatures. In one embodiment, the temperature differential represents the difference between the maximum temperature and the minimum temperature. In certain embodiments, the PUAP block 210 may calculate a temperature differential with reference to a certain component of the device, such as the display 102, the surface 103, the controller 105, or another component having a maximum operating temperature. Here, the temperature differential may be the difference between a temperature measured at a particular location and the temperature at the surface 103 (or at the other component having a maximum operating temperature). Where multiple power domains are represented in the temperature data, the temperature differential may be a temperature differential among the plurality of power domains, such as the difference between a hottest power domain and a coolest power domain.

In certain embodiments, the PUAP block 210 performs additional statistical analysis of the temperature data 207. For example, the PUAP block 210 may identify statistical trends from the temperature data 207, an average temperature, a windowed average, and amount of variance in the temperature data 207, standard deviation of the temperature data 207, and the like. In some embodiments, the PUAP block 210 may identify a temperature gradient across various locations of the device (e.g., electronic device 101). For example, the temperature gradient may map temperature differentials across the various locations of the device. The PUAP block 210 outputs the results of its processing and analysis as temperature data 213

As depicted, the thermal mitigation system 200 may include a high threshold comparator 215 and a low threshold comparator 220. The PUAP block 210 feeds the temperature data 213 to the high threshold comparator 215 and the low threshold comparator 220. In certain embodiments, the PUAP block 210 may output the temperature differential to both the high threshold comparator 215 and the low threshold comparator 220. Alternatively (or additionally), the PUAP block 210 may feed the maximum temperature to the high threshold comparator 215 and the minimum temperature to the low threshold comparator 220.

The high threshold comparator 215 compares the input temperature data 213 to an upper threshold (e.g., a temperature or differential "ceiling"). Where the input data is a maximum temperature, the high threshold comparator 215 compares it to one or more maximum operating temperatures (e.g., of the surface 103). Where the temperature data is a temperature differential, the high threshold comparator 215 compares it to one or more differential threshold. In other embodiments, the high threshold comparator 215 may compare an amount of variance to a variance threshold, a temperature gradient to one or more gradient thresholds, and the like.

The high threshold comparator 215 indicated the comparison result to the power source differentiation processing ("PSDP") block 225, wherein the PSDP block 225 controls thermal mitigation activities of the thermal mitigation system 200 based in part on the output of the high threshold comparator 215. While only a single high threshold comparator 215 is shown, in other embodiments the thermal mitigation system 200 may include a plurality of high threshold comparators 215, each high threshold comparator 215 comparing a single input parameter (e.g., maximum temperature, minimum texture, or temperature differential) to a parameter-specific threshold. In such circumstances, each high threshold comparator 215 indicates the results of its comparison to the PSDP block 225.

The low threshold comparator 220 compares the input temperature data 213 to a lower threshold (e.g., a temperature or differential "floor"). Where the input data is a minimum temperature, the low threshold comparator 220 compares it to one or more operating temperatures thresholds. Alternatively, the low threshold comparator 220 may compare the maximum temperature to a lower threshold below which thermal mitigation is unnecessary. Where the temperature data is a temperature differential, the low threshold comparator 220 compares it to one or more differential threshold. In other embodiments, the low threshold comparator 220 may compare an amount of variance to a variance threshold, a temperature gradient to one or more gradient thresholds, and the like.

The low threshold comparator 220 indicated the comparison result to the power source differentiation processing ("PSDP") block 225, wherein the PSDP block 225 controls thermal mitigation activities of the thermal mitigation system 200 based in part on the output of the low threshold comparator 220. While only a single low threshold comparator 220 is shown, in other embodiments the thermal mitigation system 200 may include a plurality of low threshold comparators 220, each low threshold comparator 220 comparing a single input parameter (e.g., maximum temperature, minimum texture, or temperature differential) to a parameter-specific threshold. In such circumstances, each low threshold comparator 220 indicates the results of its comparison to the PSDP block 225.

As indicated, the thermal mitigation system 200 includes a power source differentiation processing ("PSDP") block 225. The PSDP block 225 receives input from the PUAP block 210, the high threshold comparator 215, and the low threshold comparator 220 and controls thermal mitigation activities of the thermal mitigation system 200 based on the input data (e.g., the temperature data 213 and results from the high threshold comparator 215 and the low threshold comparator 220). For example, the PSDP block 225 determines whether the device is uniformly heated (see decision block 230). In response to the device being uniformly heated, the PSDP block 225 allows device performance to increase (see block 235). Allowing device performance to increase includes maintaining device performance at a maximum performance level (e.g., operating frequency).

Otherwise, in response to the device not being uniformly heated, the PSDP block 225 allows device performance to reduce (see block 240). Allowing device performance to reduce includes lowering an operating frequency of the controller 105 or a power domain within the device. Allowing device performance to reduce may also include maintaining the operating frequency of the controller 105 (or power domain) at a lower (e.g., minimum) operating frequency. The thermal mitigation system 200 continually monitors temperatures of the device and processes the temperature data to mitigate heat generation through increasing, maintaining, and reducing the device performance.

In some embodiments, the PSDP block 225 identifies a dominant heat source using temperature differential data. For example, the PSDP block 225 may determine whether internal heat sources or external heat sources are dominant. Further, the PSDP block 225 may distinguish between a plurality of internal heat sources to identify the dominant heat source.

As used herein, the dominant heat source refers to a source of heat contributing most to the temperatures within the device. Mechanisms for heat from the external heat source reaching the device include convection heating, radiant heating, and conduction heating. Examples of external heat sources include, but are not limited to, the air surrounding the device, sunlight striking the device, a hot surface in contact with the device, a hot object near the device. Examples of internal heat sources include, but are not limited to, the controller 105, the display 102, the power system 120, and the transceiver 135.

The PSDP block 225 may determine an external heat source to be the dominant heat source in response to temperatures within the device exhibiting high degree of uniformity (e.g., having a low temperature differential). In certain embodiments, the PSDP block 225 may determine an external heat source to be the dominant heat source in response to the device exhibiting higher temperatures near the surface 103 than near the center of the device. Here, the high temperature may be at one surface (e.g., in the case of the device resting upon a hot surface or being placed in strong sunlight) or at multiple surfaces (e.g., in the case of heating from the air surrounding the device). Where the dominant heat source is an external heat source, the PSDP block 225 allows the device performance to increase (or maintain at a high/maximum level).

In contrast, the PSDP block 225 may determine an internal heat source to be the dominant heat source in response to temperatures within the device exhibiting a low degree of uniformity. Specifically, where temperatures near the center of the device or near potential internal heat sources are higher than the temperatures near the surface 103, then the PSDP block 225 determines that an internal heat source is the dominant heat source. In some embodiments, the PSDP block 225 identifies that an internal heat source is the dominant source due to a temperature differential between the sensors 125*a-n* exceeding a threshold amount. For example, the high threshold comparator 215 may indicate to the PSDP block 225 that the temperature differential exceeds an upper threshold.

Where the dominant heat source is an external heat source, the PSDP block 225 allows the device performance to decrease (or maintain at a low/minimum level). Further, where the PSDP block 225 is able to identify particular component as the dominant heat source, the PSDP block 225 may reduce performance of the particular component while maintaining performance of other components in the device. Similarly, where the PSDP block 225 is able to identify particular power domain as the dominant heat source, the PSDP block 225 may reduce performance at the particular power domain while maintaining performance at other power domains in the device.

While depicted as a series of functional blocks, the thermal mitigation system 200 may be implemented by a single IC chip that receives data from the sensors 125*a-n* and signals thermal mitigation decisions to the controller 105. For example, the thermal mitigation system 200 may be implemented by circuitry within the controller 105. Alternatively, the thermal mitigation system 200 may be implemented by program code executed by the controller 105, the thermal mitigation module 130, or by another IC chip in the device.

Figure 3:
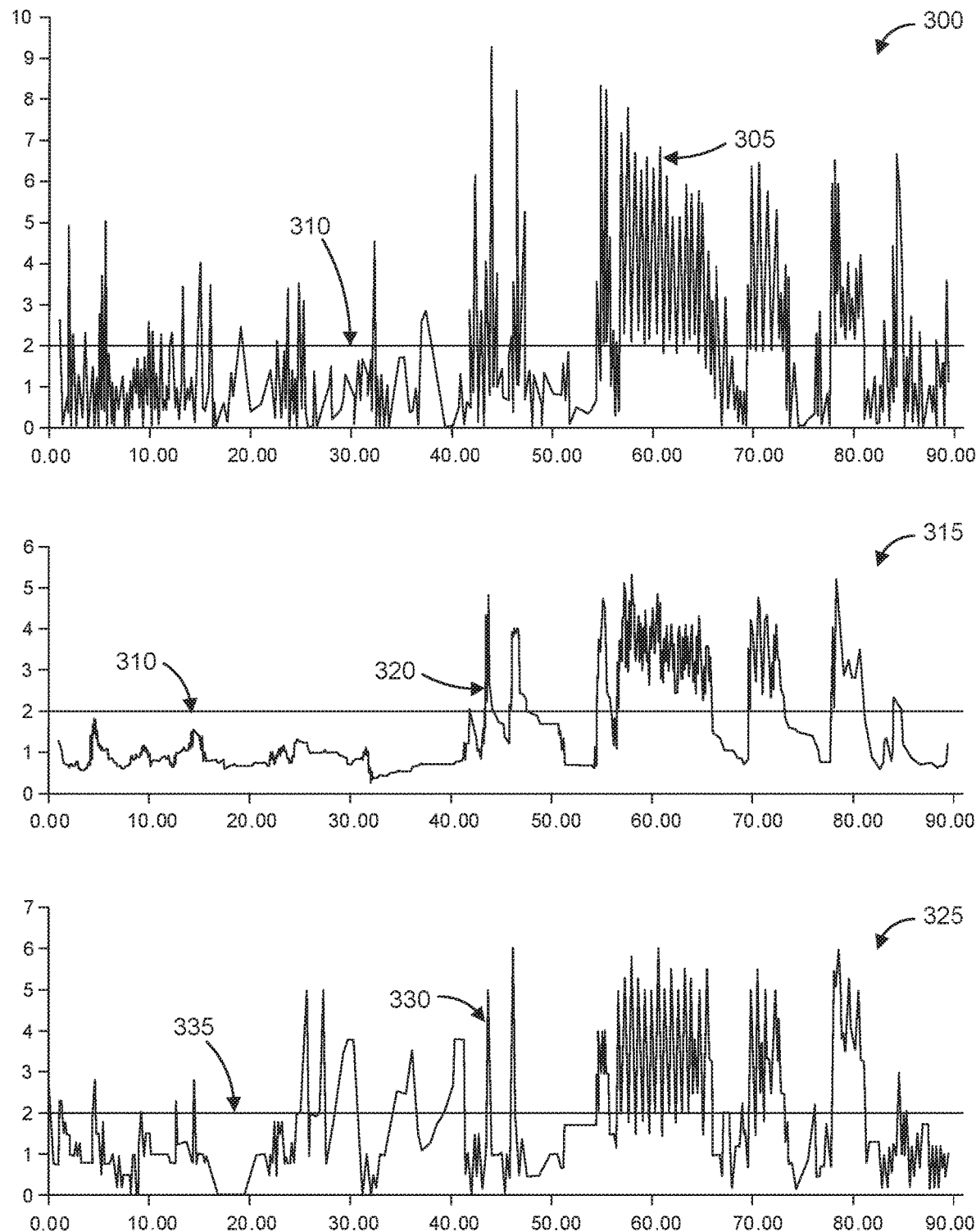
FIG. 3 is a diagram illustrating one embodiment of relationships between instantaneous power, average power, and temperature uniformity.

FIG. 3 illustrates relationships between instantaneous power, average power, and temperature uniformity, according to embodiments of the disclosure. In one embodiment, the graphs of FIG. 3 depict conditions of the electronic device 101 and/or the thermal mitigation system 200. A first graph 300 displays an instantaneous power plot 305 over a 90-minute time interval. The first graph 300 also shows a first threshold 310 for differentiating high power consumption from low power consumption. Here, power consumption above the first threshold 310 is considered to be high power consumption, while power consumption below the first threshold 310 is considered to be low power consumption.

A second graph 315 displays an average power plot 320 over the same 90-minute time interval. Here, a 20-period moving average is used to determine the average power plot 320 from the instantaneous power plot 305. In other embodiments, other methods of averaging power may be used. The second graph 315 also includes the first threshold 310. Note that moments of high power consumption are fewer with the average power plot 320 than with the instantaneous power plot 305.

A third graph 325 displays a temperature differential plot 330 over the same 90-minute time interval. Here, the temperature differential plot 330 is determined using at least two temperature sensors, for example a temperature sensor near the device CPU and another temperature sensor near the device surface. Note the relationship between the temperature differential plot 330 and both the instantaneous power plot 305 and the average power plot 320. Generally, moments of higher power consumption correspond to higher temperature differentials. This is due to the device consuming electrical energy and generating heat due to both work performed (e.g., switching transistors) and circuit impedance.

The third graph 325 also includes a second threshold 335 for differentiating between moments of high temperature uniformity and moments of low temperature uniformity. As the temperature differential plot 330 increases, the temperature uniformity decreases. Thus, a temperature differential plot 330 above the second threshold 335 indicates a low temperature uniformity, while a temperature differential plot 330 below the second threshold 335 indicates a high temperature uniformity. As discussed above, high temperature uniformity indicates that an external heat source is a dominant heat source, while low temperature uniformity indicates that an internal heat source is the dominant heat source.

When a device, such as a mobile phone, is externally heated, such as from sunlight or air, all temperature sensors will be within a degree or two of one another. Thus, a high degree of temperature uniformity (reflected in a small temperature differential or variance) indicates that heating of the device is mainly due to external sources rather than due to processor load or other internal sources. When heat is generated internally, one or more temperature sensors will report a temperature significantly higher than the others indicating a high power scenario within the device which will transfer heat to other regions of the device, including the device surface.

Figure 4A:
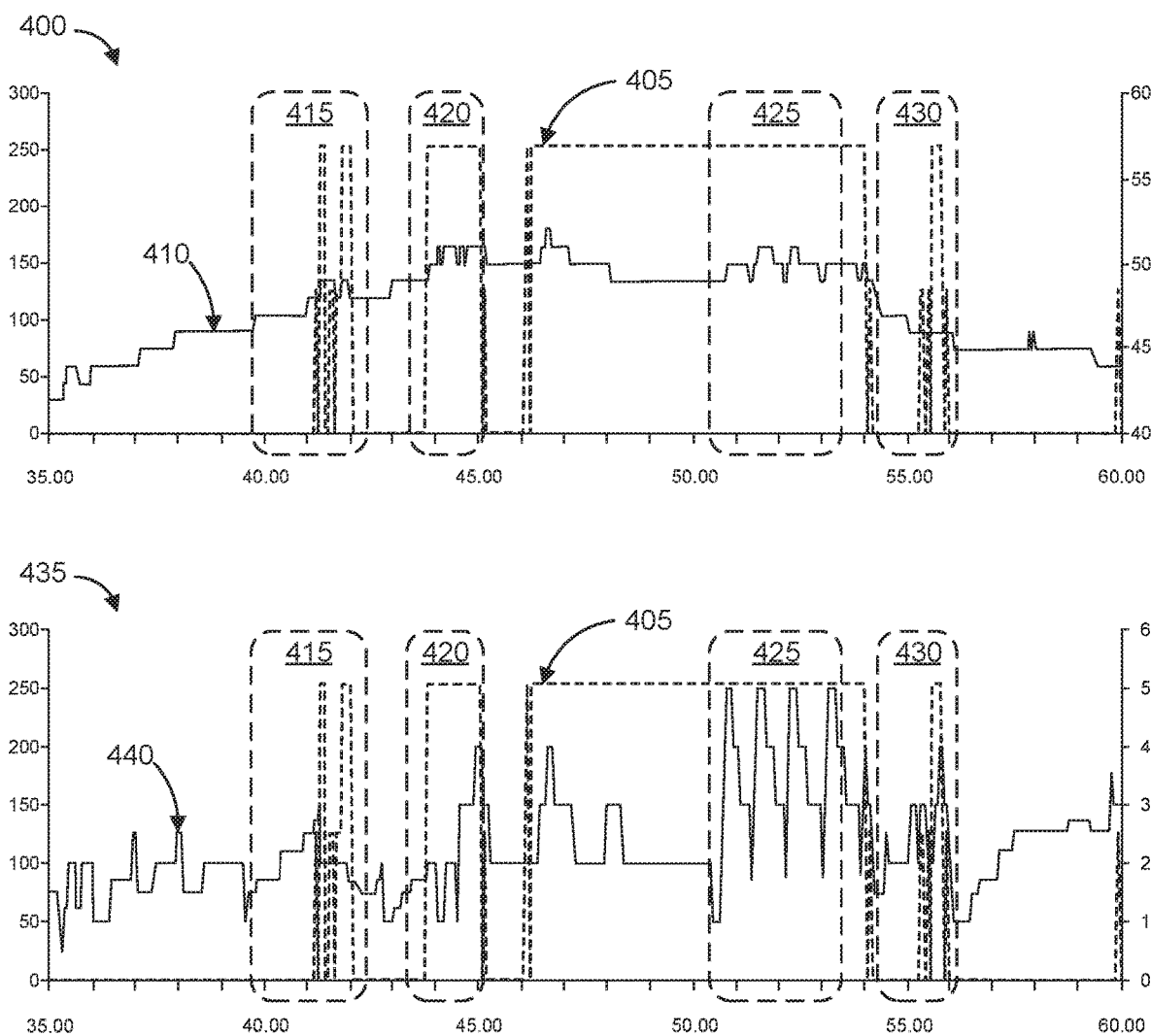
FIG. 4A is a diagram illustrating one embodiment of relationships between backlight level, surface temperature, and temperature gradient.
Figure 4B:
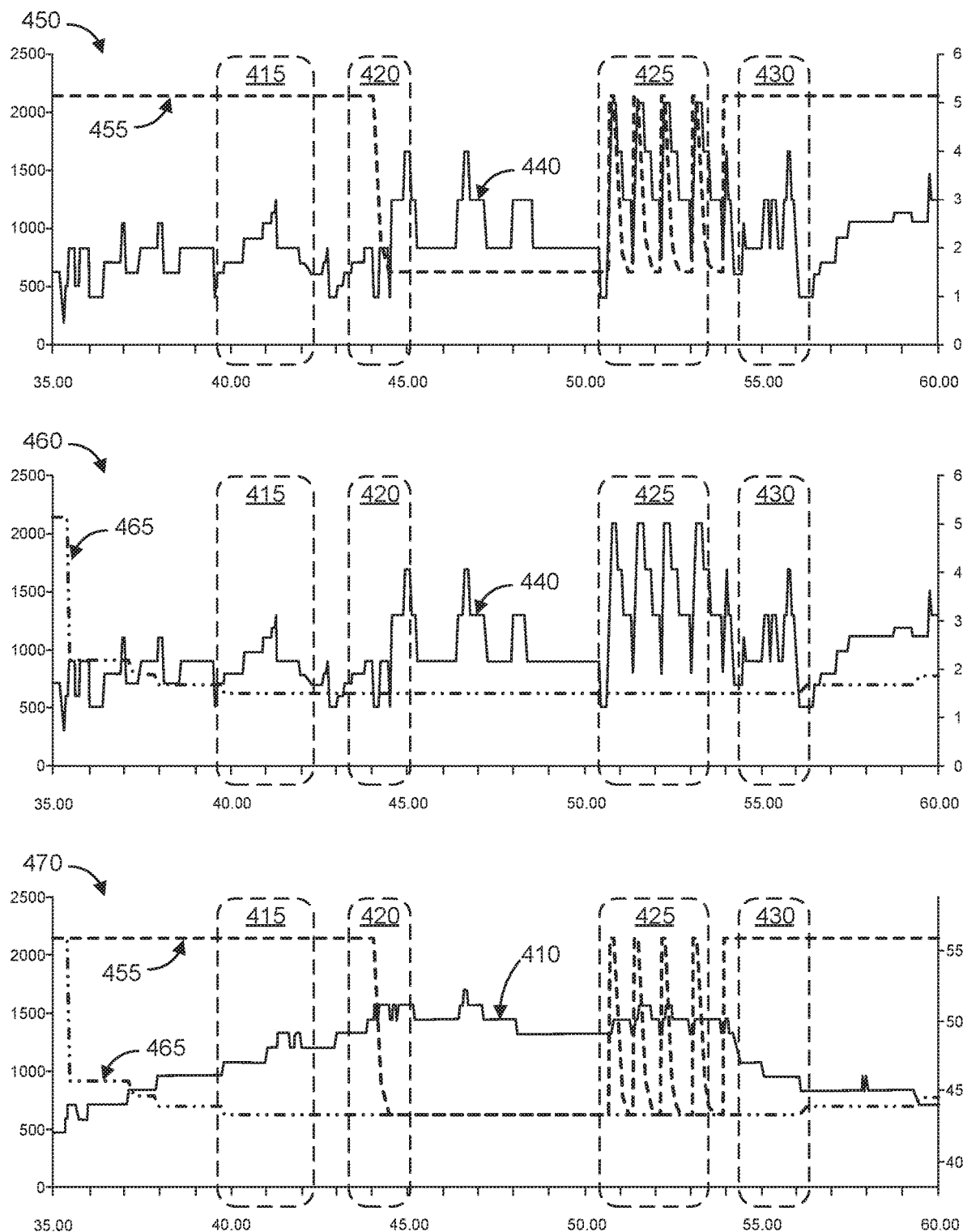
FIG. 4B is a diagram illustrating one embodiment of relationships between CPU frequencies and temperature gradient.

FIGS. 4A-4B depict relationships between backlight level, surface temperature, temperature differential, and CPU clock frequencies at a device (e.g., the electronic device 101) over a 60-minute interval, according to embodiments of the disclosure. The 60-minute interval includes a first interval 415, a second interval 420, a third interval 425, and a fourth interval 430. FIG. 4B illustrates performance differences between thermal mitigation based on temperature differential and conventional thermal mitigation based solely on surface temperatures. In one embodiment, the graphs of FIGS. 4A-4B depict conditions and actions of the electronic device 101 and/or the thermal mitigation system 200.

In the embodiments of FIGS. 4A-4B, thermal mitigation is based a combination rules using both, where there is CPU throttling when the temperature exceeds a critical temperature (here 50° C.). While described as a maximum surface temperature, the critical temperature may alternatively be a maximum circuit temperature (e.g., a junction temperature). If the critical temperature is not exceeded, then CPU throttling begins when a temperature differential is greater than or equal to an upper differential threshold (here a temperature difference of 5) and CPU throttling ceases when a temperature differential is less than a lower differential threshold (here a temperature difference of 2). The threshold describe herein are merely examples illustrating the principles at hand and other embodiments may use the same or different thresholds.

FIG. 4A illustrates relationships between backlight level, surface temperature, and temperature differential, according to embodiments of the disclosure. A first graph 400 displays both a backlight level plot 405 (depicted as a dashed line) and a surface temperature plot 410 over the 60-minute interval. The surface temperature is measured using a temperature sensor at or near the device surface.

Generally, the backlight level plot 405 indicates whether the device is being used, as the backlight is generally on when the device is in use and turns off when the device not in use. Here, the backlight level fluctuates between 255 (e.g., "on") and zero (e.g., "off") without intermediate light levels. In other embodiments, the backlight level may include one or more intermediate levels between zero and 255. Additionally, the surface temperature varies from about 42° C. to 52° C. over the 60-minute interval. In comparing the backlight level plot 405 with the surface temperature plot 410, note that while the backlight level affects the surface temperature, other heat sources also affect the surface temperature.

FIG. 4A includes a second graph 435 that displays the backlight level plot 405 and a temperature differential plot 440 over the same 60-minute interval. The temperature differential is calculated using a set of at least two temperature sensors, for example a temperature sensor near the device CPU and another temperature sensor near the device surface. In some embodiments, the temperature differential ("$T_{Diff}$") is the mathematical difference between a highest temperature measured at a set of sensors (e.g., temp_sensor_1, temp_sensor_2, ..., temp_sensor_N) and a minimum temperature measured at the set of sensors, represented by Equation 1:

$$T_{Diff} = \max(\text{temp\_sensor\_1}, \text{temp\_sensor\_2}, \ldots, \text{temp\_sensor\_N}) - \min(\text{temp\_sensor\_1}, \text{temp\_sensor\_2}, \ldots, \text{temp\_sensor\_N}) \quad \text{Eq. 1}$$

In other embodiments, the temperature differential may be an amount of variance in the temperatures measured by the set of sensors, or a location-based temperature gradient calculated from the set of sensors. Here, the temperature differential varies between about 0.5° and 4°. Note that there is a low correlation between the temperature differential plot 440 and the backlight level plot 405. Also, note that while there is some correlation between the temperature differential plot 440 and the surface temperature plot 410, higher temperature differentials do not necessarily correspond to higher surface temperatures.

FIG. 4B illustrates relationships between CPU clock frequencies, temperature differential, and surface temperature, according to embodiments of the disclosure. A third graph 450 displays the temperature differential plot 440 and a first set of CPU frequencies 455 over the same 60-minute interval. Here, the device CPU frequency (e.g., device performance) is regulated using the temperature differential. The device CPU frequency is also regulated based on surface temperatures, junction temperatures, and the like as described herein.

A fourth graph 460 that displays the temperature differential plot 440 and a second set of CPU frequencies 465 over the same 60-minute interval. Here, the second set of CPU frequencies 465 are regulated conventionally based on surface temperature at the device (e.g., shown in the surface temperature plot 410) and without regard to the temperature differential. Note the lack of correlation between the temperature differential plot 440 and the second set of CPU frequencies 465. FIG. 4B includes a fifth graph 470 that displays the surface temperature plot 410 and contrasts the first set of CPU frequencies 455 with the second set of CPU frequencies 465.

As shown in FIGS. 4A-4B, during the first interval 415 the surface temperature approaches 49° C. as the backlight turns on (e.g., has a level of 255), indicating use by the user. At the beginning of the first interval the temperature differential is below 2, indicating a high degree of temperature uniformity (indicative of the dominant heat source being an external heat source). Further, the temperature differential remains below 3 during the first interval 415. Because of the low temperature differential, the CPU is allowed to operate at its maximum frequency (depicted as 2.1 GHz) during the first interval 415, as shown by the first set of CPU frequencies 455.

Traditional throttling scheme would begin throttling the CPU once the surface temperature 410 reached 45° C., as indicated by the second set of CPU frequencies 465, resulting in the CPU operating at or near a minimum frequency during the first interval 415. Here the minimum CPU frequency is depicted as approximately 650 MHz. By throttling the CPU frequency to a minimum frequency, CPU heat generation is minimized and the device is able to maintain or reduce the surface temperature if the CPU is the dominant heat source. However, if the CPU is not the dominant heat source, then CPU throttling is not needed and results in unnecessarily diminishes device performance. Considering the temperature differential (and thus differentiating heat sources) beneficially allows the device to maximize CPU performance when the CPU is not the dominant heat source.

During the second interval 420 the device throttles the CPU because the surface temperature reaches a critical level. At the beginning of the second interval 420, the screen is off (e.g., indicated by the backlight level being zero), yet the surface temperature is 49° C. About one minute into the second interval 420, the user again uses the device and the surface temperature exceeds 50° C. and the first set of CPU frequencies 455 show the CPU throttling down to the minimum frequency. Here, the critical temperature of 50° C. is exemplary and may be set to other values in other embodiments. Note that the temperature differential 440 starts out at 2, but increases to 4 over the second interval 420. This indicates that the CPU is becoming the dominant heat source. Under the traditional throttling scheme, the CPU stays at the minimum frequency throughout the second interval 420, as indicated by the second set of CPU frequencies 465, due to the surface temperature 410 being above 45° C.

Between the second interval 420 and the third interval 425, the user uses the device for about five minutes. For example, the user may be playing a game on the device. Note that despite the continual usage, the surface temperature decreases to below 50° C. This may be due to the user moving into a cooler environment (e.g., moving indoors on a hot day), moving out of the sunlight, or doing something else to cool the outside of the device.

During the third interval 425, the CPU is permitted to run at the maximum frequency once the temperature differential drops below 2 (e.g., CPU throttling ceases). Here, a temperature differential of 2 may be a minimum differential threshold, wherein CPU throttling (once begun) is permitted to cease once the temperature differential drops below the minimum differential threshold. Additionally, the device may have a maximum differential threshold where CPU throttling begins if the temperature differential reaches the maximum differential threshold even if the critical temperature is not exceeded.

During the third interval 425, the first set of CPU frequencies 455 cycles between the maximum frequency (e.g., 2100 MHz) and the minimum frequency (e.g., 650 MHz) as the temperature differential reaches the maximum differential threshold (e.g., 5) and the minimum differential threshold (e.g., 2). Note that during the third interval 425 the surface temperature varies by only two degrees. The surface temperature exceeds 50° C. (the critical temperature) twice during the third interval 425, however in both instances throttling the CPU has already begun due to the temperature differential reaching the maximum differential threshold, as shown in the fifth graph 470. Note that traditional schemes restrict the CPU frequency to a minimum during the third interval 425, as shown in the second set of CPU frequencies 465.

At the beginning of the fourth interval 430, device use has ended resulting in reduction of the surface temperature and the temperature differential. Because the temperature differential has dropped below the minimum differential threshold and the surface temperature is below the critical temperature, the CPU is permitted to operate at maximum frequency, as shown in the first set of CPU frequencies 455. Under the traditional throttling scheme, the second set of CPU frequencies 465 stays at the minimum frequency throughout the fourth interval 430, as indicated by, due to the surface temperature being above 45° C.

Figure 5:
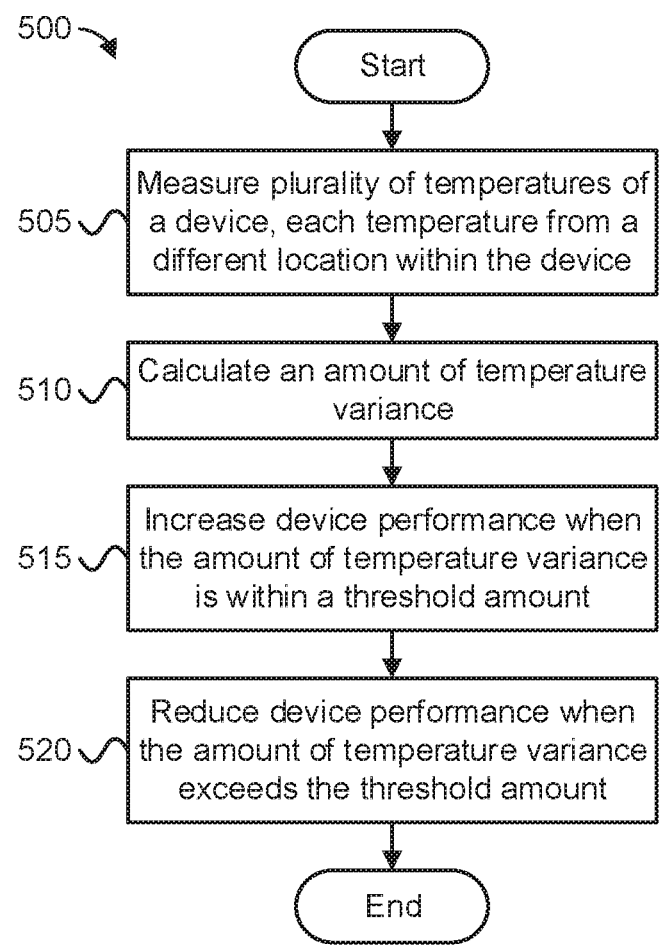
FIG. 5 is a schematic flow chart diagram illustrating one embodiment of method for controlling device performance based on temperature differential.

FIG. 5 illustrates a method 500 for thermal mitigation based on temperature differential, according to embodiments of the disclosure. The method 500 mitigates heat generation at a processing device by selectively maintaining or decreasing processor performance based on a temperature differential measured at the processing device, such as the electronic device 101. In one embodiment, the electronic device 101 performs the method 500, for example using a thermal mitigation module 130. In another embodiment, the thermal mitigation system 200 performs the method 500. In addition, the method 500 may be performed by a processor (e.g., the controller 105) and/or other semiconductor hardware embodied in the electronic device 101. In another example, the method 500 may be embodied as computer program code stored on computer readable storage media.

The method 500 begins and measures 505 a plurality of temperatures of a device. Each temperature is measured 505 from a different location within the device. In certain embodiments, the thermal mitigation module 130 and/or the PUSSH block 205 measures 505 the temperatures at the different locations by interpreting signals from the plurality of temperature sensors 125.

The method 500 includes calculating 510 an amount of temperature variance. Here, the amount of temperature variance is calculated from the plurality of temperatures. In some embodiments, calculating 510 an amount of temperature variance includes calculating a standard of deviation of the plurality of temperatures. In certain embodiments, calculating 510 an amount of temperature variance includes calculating a temperature differential. In certain embodiments, the thermal mitigation module 130 and/or the PUAP block 210 calculates 510 the amount of temperature variance.

The method 500 increases 515 the device performance level in response to the amount of temperature variance being within a threshold amount. In one embodiment, "being within" the threshold amount means that the amount of temperature variance is less than or equal to the threshold amount. As used herein, increasing 515 the device performance level comprises maintaining a maximum performance level (e.g., a maximum clock frequency) or increasing a performance level (e.g., clock frequency) if not already at the maximum performance level. Additionally, the method 500 reduces 520 device performance in response to the amount of temperature variance exceeding the threshold amount. As used herein, reducing 520 the device performance level comprises maintaining a minimum performance level (e.g., a minimum clock frequency) or decreasing a performance level (e.g., clock frequency) if not already at the minimum performance level.

In certain embodiments, the thermal mitigation module 130 and/or the PSDP block 225 increases 515 or reduces 520 device performance based on a comparison of the amount of temperature variance to the threshold amount. The threshold amount is selected to identify whether an internal heat source is the dominant heat source for the device. If the amount of temperature variance exceeds the threshold amount, then an internal heat source is the dominant heat source and the method 500 reduces 520 device performance in order to mitigate internal heat generation. The method 500 ends.

Figure 6:
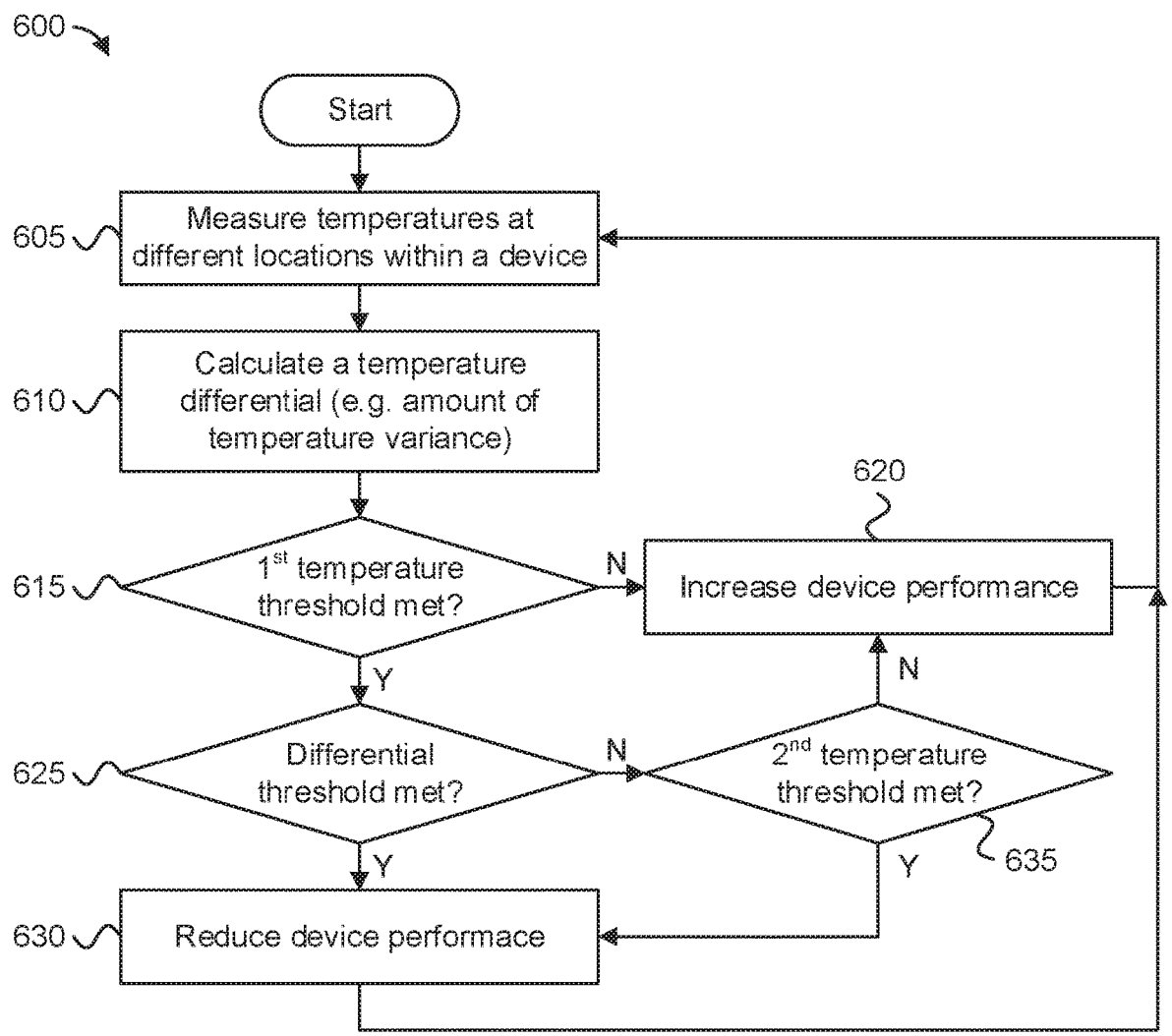
FIG. 6 is a schematic flow chart diagram illustrating another embodiment of method for controlling device performance based on temperature differential.

FIG. 6 illustrates a method 600 for thermal mitigation based on temperature differential, according to embodiments of the disclosure. The method 600 implements thermal mitigation by selectively maintaining, increasing, or decreasing processor performance based on a temperature differential measured at a processing device, such as the electronic device 101. In some embodiments, the method 600 may be performed by the electronic device 101. In addition, the method 600 may be performed by a processor (e.g., the controller 105) and/or other semiconductor hardware embodied in the electronic device 101. In another example, the method 600 may be embodied as computer program code stored on computer readable storage media.

The method 600 begins and measures 605 temperatures at different locations within a device. Here, a plurality of temperatures is measured 505 from at least two different location within the device. In certain embodiments, the thermal mitigation module 130 and/or the PUSSH block 205 measures 505 the temperatures at the different locations by interpreting signals from the plurality of temperature sensors 125.

The method 600 includes calculating 610 a temperature differential from the measured temperatures. The temperature differential represents an amount of temperature variance among the plurality of temperature sensors 125. In certain embodiments, the thermal mitigation module 130 and/or the PUAP block 210 calculates 610 the amount of temperature differential. In one embodiment, the temperature differential is the statistical variance, e.g., equal to the square of the standard deviation of the temperatures measured from the plurality of temperature sensors 125. In another embodiment, the temperature differential may be the difference between a maximum temperature measured by the plurality of temperature sensors 125 and a minimum temperature measured by the plurality of temperature sensors 125.

The method 600 determines 615 whether a first temperature threshold is met by the measured temperatures. Determining 615 whether the first temperature threshold is met by the measured temperatures may include comparing a surface temperature to a first surface temperature threshold. For example, the surface temperature may be compared to a first limit, such as 45° C. Alternatively, determining 615 whether the first temperature threshold is met by the measured temperatures may include comparing a maximum (or minimum) temperature of the measured temperatures to the first temperature threshold.

If the first temperature threshold is not met, then thermal mitigation is not needed and the method 600 proceeds to increase 620 a level of device performance and again measure 605 temperatures at the different locations within the device. Here, increasing 620 the level of device performance refers to maintaining a CPU clock frequency at a maximum frequency or increasing a CPU clock frequency if not already at the maximum frequency. Otherwise, if the first temperature threshold is met by the measured temperatures, then thermal mitigation may be required and the method 600 proceeds to determine 625 whether a differential threshold is met by the temperature differential.

If it is determined 625 that the differential threshold is not met, then temperatures within the device are sufficiently uniform that an internal heat source is not causing the measured temperatures to meet the first temperature threshold (e.g., indicating the dominant heat source to be an external source). Otherwise, if it is determined 625 that the differential threshold is met, then an internal heat source is the dominant heat source and the method 600 proceeds to reduce 630 a level of device performance and again measure 605 temperatures at the different locations within the device. Here, reducing 630 the level of device performance refers to maintaining a CPU frequency at a minimum frequency or decreasing a CPU frequency if not already at the minimum frequency.

In certain embodiments, the differential threshold may be selected based on whether the level of device performance is reduced from a maximum level (e.g., whether the CPU frequency is being throttled). As described above with reference to FIGS. 4A-4B, a first (e.g., upper) differential threshold may be used where CPU throttling is not in effect and a second (e.g., lower) differential threshold may be used where CPU is being throttled. Thus, CPU throttling may begin when a temperature differential is greater than or equal to the upper differential threshold and CPU throttling may cease when the temperature differential becomes less than the lower differential threshold.

Further, the method 600 determines 635 whether a second temperature threshold is met in response to determining 625 that the differential threshold is not met. The second temperature threshold is greater (e.g., a higher temperature) than the first temperature threshold. The second temperature threshold may be a critical (e.g., maximum) temperature such that thermal mitigation is needed to cool the device, even when an internal source is not the dominant heat source. In one embodiment, the second temperature threshold is a critical surface temperature. In another embodiment, the second temperature threshold is a critical junction (e.g., circuit) temperature. In response to the second temperature threshold being met, the method 600 proceeds to reduce 630 the level of device performance, regardless of whether the differential threshold is met. Otherwise, in response to both the second temperature threshold not being met and the differential threshold not being met, the method proceeds to increase 620 the level of device performance.

The method 600 ends. In some embodiments, the device includes multiple power domains having a throttleable component. In such embodiments, the method 600 includes calculating 610 a temperature differential for each power domain and either increasing 620 a level of performance or reducing 630 a level of performance (e.g., clock frequency) for the throttleable component based on whether temperature and/or differential thresholds are met, as discussed above. Thus, reducing 630 a level of device performance may include only reducing performance at a power domain having a temperature differential exceeding the differential threshold until the second temperature threshold is met.

Embodiments may be practiced in other specific forms. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus comprising:
    a plurality of sensors positioned at different locations of the apparatus;
    a controller;
    a memory that stores code executable by the controller to:
        determine a plurality of temperatures using the plurality of sensors, each temperature corresponding to a different location within the apparatus, wherein the plurality of temperatures includes a first temperature corresponding to a surface of the apparatus and a second temperature corresponding to an internal component of the apparatus;
        calculate a temperature differential for the apparatus using the plurality of temperatures;
        determine, using the temperature differential, whether an increase in temperature of the apparatus is caused by an internal heat source;
        maintain device performance in response to the temperature differential indicating that the increase in temperature of the apparatus is not caused by an internal heat source; and
        throttle device performance in response to the temperature differential indicating that the increase in temperature of the apparatus is caused by an internal heat source.

2. The apparatus of claim 1, wherein calculating the temperature differential for the apparatus comprises the controller:
    identifying a maximum temperature among the plurality of temperatures; and
    identifying a minimum temperature among the plurality of temperatures, wherein the temperature differential is a difference between the maximum temperature and the minimum temperature.

3. The apparatus of claim 1, the controller further compares the plurality of temperatures to a first temperature threshold, wherein throttling device performance in response to the temperature differential indicating that the increase in temperature of the apparatus is caused by an internal heat source comprises:
    reducing a processor operating frequency in response to a temperature exceeding the first temperature threshold and the temperature differential indicating that the increase in temperature of the apparatus is caused by an internal heat source; and
    maintaining the processor operating frequency in response to a temperature not exceeding the first temperature threshold.

4. The apparatus of claim 3, wherein the controller further:
    compares the plurality of temperatures to a second temperature threshold greater than the first temperature threshold; and reduces the processor operating frequency in response to a temperature exceeding the second temperature threshold.

5. The apparatus of claim 4, wherein the second temperature threshold is a maximum surface temperature.

6. The apparatus of claim 4, wherein the second temperature threshold is a maximum circuit temperature.

7. The apparatus of claim 1, wherein the apparatus comprises a plurality of power domains, each power domain comprising a throttleable component, wherein at least one of the plurality of temperatures corresponds to each power domain.

8. The apparatus of claim 7, wherein the controller further identifies a power domain causing elevated temperatures in response to the temperature differential indicating that the increase in temperature of the apparatus is caused by an internal heat source, wherein throttling device performance comprises the controller reducing performance of the throttleable component of the identified power domain.

9. The apparatus of claim 8, wherein identifying a power domain causing elevated temperatures comprises the controller calculating a temperature differential among the plurality of power domains.

10. The apparatus of claim 1, wherein determining the plurality of temperatures using the plurality of sensors comprises calculating at least one temperature from an amount of current.

11. A method comprising:
measuring a plurality of temperatures of a device, each temperature corresponding to a different location within the device, wherein the plurality of temperatures includes a first temperature corresponding to a surface of the device and a second temperature corresponding to an internal component of the device;
calculating, using a processor, an amount of temperature variance using the plurality of temperatures;
increasing device performance in response to the amount of temperature variance being within a threshold amount; and
reducing device performance in response to the amount of temperature variance exceeding the threshold amount.

12. The method of claim 11, wherein calculating the amount of temperature variance comprises determining a standard deviation of the plurality of temperatures, wherein increasing device performance comprises maintaining a device performance level in response to the device operating at a maximum performance level, and wherein reducing device performance comprises maintaining a device performance level in response to the device operating at a minimum performance level.

13. The method of claim 11, further comprising comparing the plurality of temperatures to a first temperature threshold, wherein reducing device performance in response to the amount of temperature variance exceeding the threshold amount comprises:

reducing a processor operating frequency in response to a temperature exceeding the first temperature threshold and the amount of temperature variance exceeding the threshold amount; and
maintaining the processor operating frequency in response to a temperature not exceeding the first temperature threshold.

14. The method of claim 13, further comprising:
comparing the measured temperatures to a second temperature threshold greater than the first temperature threshold; and
reducing the processor operating frequency in response to a temperature exceeding the second temperature threshold.

15. The method of claim 14, wherein the second temperature threshold is one of a maximum surface temperature and a maximum circuit temperature.

16. The method of claim 11, wherein measuring a plurality of temperatures of a device comprises measuring a temperature for a plurality of power domains within the device.

17. The method of claim 16, wherein reducing device performance in response to the amount of temperature variance exceeding the threshold amount comprises reducing performance only at power domains having a temperature variance exceeding the threshold amount.

18. A computer program product comprising a non-transitory computer readable storage medium that stores code executable by a processor, the executable code comprising code to perform:
measuring a plurality of temperatures of a device, each temperature corresponding to a different power domain of the device;
calculating a temperature gradient using the plurality of temperatures;
determining a heat source from the temperature gradient in response to a measured temperature exceeding a threshold temperature, the heat source being selected from an internal source and an external source;
reducing device performance in response to the device being internally heated; and
maintaining device performance in response to the device being externally heated.

19. The computer program product of claim 18, further comprising code to perform:
increasing device performance in response to the measured temperature becoming less than the threshold temperature.

20. The computer program product of claim 18, further comprising code to perform:
comparing the measured temperatures to a maximum temperature greater than the temperature threshold; and
reducing device performance in response to a temperature exceeding the maximum temperature.

* * * * *